US011336416B2

(12) United States Patent
Bi et al.

(10) Patent No.: US 11,336,416 B2
(45) Date of Patent: May 17, 2022

(54) APPARATUS AND METHOD FOR COMMUNICATION

(71) Applicant: NOKIA SOLUTIONS AND NETWORKS OY, Espoo (FI)

(72) Inventors: Bo Bi, Zhejiang (CN); Bin Li, Zhejiang (CN); Xiang Nian Zeng, Zhejiang (CN)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/492,047

(22) PCT Filed: Mar. 8, 2017

(86) PCT No.: PCT/CN2017/075970
§ 371 (c)(1),
(2) Date: Sep. 6, 2019

(87) PCT Pub. No.: WO2018/161275
PCT Pub. Date: Sep. 13, 2018

(65) Prior Publication Data
US 2020/0099496 A1 Mar. 26, 2020

(51) Int. Cl.
*H04W 72/12* (2009.01)
*H04L 5/00* (2006.01)
(Continued)

(52) U.S. Cl.
CPC .......... *H04L 5/0055* (2013.01); *H04L 1/1607* (2013.01); *H04L 1/1812* (2013.01);
(Continued)

(58) Field of Classification Search
None
See application file for complete search history.

(56) References Cited

U.S. PATENT DOCUMENTS

2013/0003672 A1* 1/2013 Dinan .................. H04L 5/0007
370/329
2015/0103705 A1* 4/2015 Yang .................... H04L 1/1861
370/280
(Continued)

FOREIGN PATENT DOCUMENTS

CN 103795508 A 5/2014
CN 104079390 A 10/2014
(Continued)

OTHER PUBLICATIONS

International Search Report and Written Opinion for Application No. PCT/CN2017/075970, dated Dec. 7, 2017, 11 pages.
(Continued)

*Primary Examiner* — Brandon M Renner
(74) *Attorney, Agent, or Firm* — Brake Hughes Bellermann LLP (57) ABSTRACT

Methods and apparatuses in a communication system, are provided. The solution comprises controlling (300) a connection to a user terminal having connections to more than one cell for carrier aggregation, controlling (302) transmission of signalling to the user terminal to use maximum allowable number of bits of hybrid automatic request feedback in transmission of positive and negative acknowledgements to more than one aggregated cell, controlling (304) reception of feedback bits from the user terminal, the feedback bits comprising positive and negative acknowledgements related to user terminal connections with the more than one aggregated cell, decoding (306) and processing feedback bits related to the connections controlled by the apparatus and transmitting (308) feedback bits related to other connections to respective cell.

15 Claims, 4 Drawing Sheets

(51) Int. Cl.
  *H04L 1/16* (2006.01)
  *H04L 1/18* (2006.01)
  *H04L 5/14* (2006.01)
  *H04W 72/04* (2009.01)
(52) U.S. Cl.
  CPC ............ *H04L 5/001* (2013.01); *H04L 5/1469* (2013.01); *H04W 72/042* (2013.01)

(56) References Cited

U.S. PATENT DOCUMENTS

| | | | |
|---|---|---|---|
| 2015/0200751 A1* | 7/2015 | Yin | H04L 5/001 370/280 |
| 2015/0295681 A1* | 10/2015 | Liang | H04J 4/00 370/280 |
| 2016/0174211 A1* | 6/2016 | Gao | H04L 5/00 370/329 |
| 2016/0174250 A1* | 6/2016 | Yang | H04L 1/1893 370/329 |
| 2016/0182211 A1* | 6/2016 | Choi | H04L 5/0055 370/280 |
| 2017/0064610 A1* | 3/2017 | Vangala | H04W 48/10 |
| 2017/0164363 A1* | 6/2017 | Zhang | H04L 47/286 |
| 2017/0310447 A1* | 10/2017 | Kusashima | H04W 72/044 |
| 2018/0006791 A1* | 1/2018 | Marinier | H04L 1/0057 |
| 2018/0124751 A1* | 5/2018 | Aiba | H04W 24/10 |
| 2018/0145796 A1* | 5/2018 | Liang | H04L 1/1861 |
| 2018/0242286 A1* | 8/2018 | Song | H04L 1/0072 |
| 2018/0278373 A1* | 9/2018 | Wang | H04L 1/1812 |
| 2018/0343097 A1* | 11/2018 | Takeda | H04L 5/1469 |

FOREIGN PATENT DOCUMENTS

| | | |
|---|---|---|
| CN | 104521169 A | 4/2015 |
| WO | 2014056198 A1 | 4/2014 |
| WO | 2014116071 A1 | 7/2014 |

OTHER PUBLICATIONS

European Search Report for European Patent Application No. 17899640.1, dated Oct. 26, 2020, 51 pages.

3GPP TSG RAN WG1 Meeting #88, R1-1702430; "Discussion on Maximum TA and Processing Time"; Athens, Greece; Feb. 13-17, 2017; 5 pages.

* cited by examiner

APPARATUS AND METHOD FOR COMMUNICATION

CROSS-REFERENCE TO RELATED APPLICATIONS

This application is a national stage entry of International Application No. PCT/CN2017/075970, filed Mar. 8, 2017, entitled "APPARATUS AND METHOD FOR COMMUNICATION" which is hereby incorporated by reference in its entirety.

TECHNICAL FIELD

The exemplary and non-limiting embodiments of the invention relate generally to communications.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In communication systems, connections between communicating parties were in the past single connections. Recently, multi-connectivity has been the object of increasing research. This applies especially to wireless communication systems comprising user terminals in cells served by base stations or the like. In multi-connectivity, a communicating party such as a user terminal is not connected only to a single cell on a single frequency layer, but simultaneously to multiple cells on different frequency layers or even different, not necessarily co-sited radio interfaces.

Current LTE (long term evolution) supports carrier aggregation where a user terminal can be connected to multiple cells of two different base stations. Mobile networks which are currently being developed will likely provide even more options for multi-connectivity.

Processing data packets which are transmitted through more than one transmission link presents challenges as fast and reliable transmission of data is of importance in many applications.

BRIEF DESCRIPTION

According to an aspect of the present invention, there is provided an apparatus in a communication system, comprising: at least one processor; and at least one memory including computer program code, the at least one memory and the computer program code configured to, with the at least one processor, cause the apparatus at least to perform: control a connection to user terminal having connections to more than one cell for carrier aggregation; control transmission of signalling to a user terminal to use maximum allowable number of bits of hybrid automatic request feedback in transmission of positive and negative acknowledgements to more than one aggregated cell; control reception of feedback bits from the user terminal, the feedback bits comprising positive and negative acknowledgements related to user terminal connections with the more than one aggregated cell; decode and process feedback bits related to the connections controlled by the apparatus; transmit feedback bits related to other connections to respective cell.

According to an aspect of the present invention, there is provided an apparatus in a communication system, comprising: means for controlling a connection to a user terminal having connections to more than one cell for carrier aggregation; means for controlling transmission of signalling to the user terminal to use maximum allowable number of bits of hybrid automatic request feedback in transmission of positive and negative acknowledgements to more than one aggregated cell; means for controlling reception of feedback bits from the user terminal, the feedback bits comprising positive and negative acknowledgements related to user terminal connections with the more than one aggregated cell; means for decoding and processing feedback bits related to the connections controlled by the apparatus; and means for transmitting feedback bits related to other connections to respective cell.

According to an aspect of the present invention, there is provided an apparatus in a communication system, comprising: at least one processor; and at least one memory including computer program code, the at least one memory and the computer program code configured to, with the at least one processor, cause the apparatus at least to perform: control a downlink connection to a user terminal having connections to more than one cell for carrier aggregation; control transmission of signalling to the user terminal to use maximum allowable number of bits of hybrid automatic request feedback in transmission of positive and negative acknowledgements to more than one aggregated cell; control reception of a transmission from a base station serving an aggregated cell, the transmission comprising feedback bits, the feedback bits comprising positive and negative acknowledgements related to user terminal connection with the apparatus.

According to an aspect of the present invention, there is provided an apparatus in a communication system, comprising: means for controlling a downlink connection to a user terminal having connections to more than one cell for carrier aggregation; means for controlling transmission of signalling to the user terminal to use maximum allowable number of bits of hybrid automatic request feedback in transmission of positive and negative acknowledgements to more than one aggregated cell; and means for controlling reception of a transmission from a base station serving an aggregated cell, the transmission comprising feedback bits, the feedback bits comprising positive and negative acknowledgements related to user terminal connection with the apparatus.

According to an aspect of the present invention, there is provided a method in a communication system, comprising: controlling a connection to a user terminal having connections to more than one cell for carrier aggregation; controlling transmission of signalling to the user terminal to use maximum allowable number of bits of hybrid automatic request feedback in transmission of positive and negative acknowledgements to more than one aggregated cell; controlling reception of feedback bits from the user terminal, the feedback bits comprising positive and negative acknowledgements related to user terminal connections with the more than one aggregated cell; decoding and processing feedback bits related to the connections controlled by the apparatus; transmitting feedback bits related to other connections to respective cell.

According to an aspect of the present invention, there is provided a method in a communication system, comprising: controlling a downlink connection to a user terminal having connections to more than one cell for carrier aggregation; controlling transmission of signalling to the user terminal to use maximum allowable number of bits of hybrid automatic request feedback in transmission of positive and negative acknowledgements to more than one aggregated cell; controlling reception of a transmission from a base station serving an aggregated cell, the transmission comprising feedback bits, the feedback bits comprising positive and negative acknowledgements related to user terminal connection with the apparatus.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached [accompanying] drawings, in which.

DETAILED DESCRIPTION OF SOME EMBODIMENTS

Embodiments are applicable to any base station, communication network element, user equipment (UE), user terminal (UT), server, corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), 5th generation mobile networks, Wireless Local Area Network (WLAN) based on IEEE 802.11 stardard, worldwide interoperability for microwave access (WiMAX), Bluetooth®, personal communications services (PCS) and systems using ultra-wideband (UWB) technology. IEEE refers to the Institute of Electrical and Electronics Engineers.

In the following, different embodiments will be described using, as an example of an access architecture to which the embodiments may be applied, a radio access architecture LTE-A and associated terminology, without limiting the invention to LTE-A, however.

Figure 1:
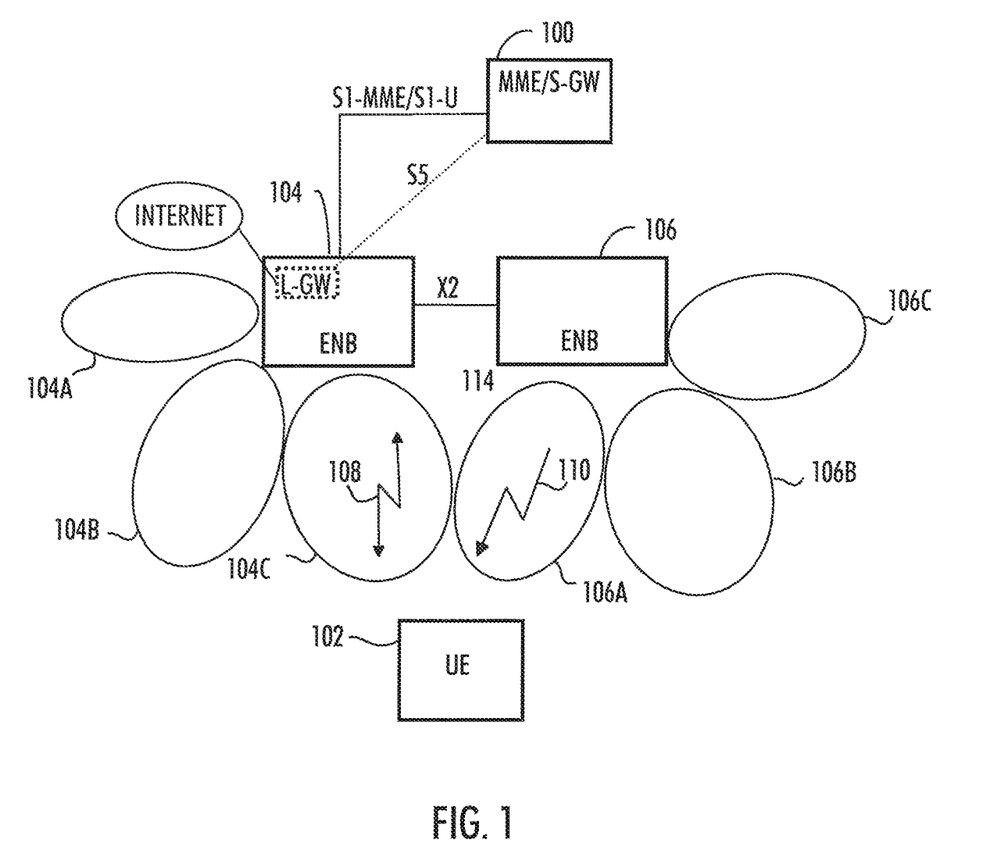
FIG. 1 illustrates an example of a communication system.

A general architecture of an exemplary system is illustrated in FIG. 1. FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary system illustrated in FIG. 1 comprises user terminals 102 (only one illustrated in FIG. 1) and two or more network nodes 104, 106 (only two illustrated in FIG. 1) controlling one or more cells in a radio access system, and a mobility management entity/serving gateway 100.

The mobility management entity (MME) represents a mobility anchor entity in a core network that is involved in the bearer activation/deactivation processes, for example. The mobility management entity is configured to support carrier aggregation. The serving gateway (S-GW) routes and forwards user data packets further.

The user terminal (user equipment, UE) 102 illustrates one type of an apparatus to which resources on the air interface are allocated and assigned, and thus any feature described herein with user apparatus (user equipment) may be implemented with a corresponding apparatus. The user terminal 102 refers to a portable computing device that includes wireless mobile communication devices operating with or without a subscriber identification module (SIM), including, but not limited to, the following types of devices: mobile phone, smart-phone, personal digital assistant (PDA), handset, laptop computer, e-reading device, and tablet. The user terminal 102 may be configured to support also carrier aggregation.

In the example of FIG. 1, both network nodes 104, 106 depict an apparatus controlling one or more cells via which access is provided to the network the user terminals and the network nodes are connected to. In this example, network node 104 maintains three cells 104A, 104B and 104C, while network node 106 maintains three cells 106A, 106B and 106C. In an LTE-A system, such a network node is an evolved node B (eNB). The evolved node B 104, or any corresponding network apparatus controlling one or more cells, is a computing device configured to control the radio resources, and connected to the evolved packet core network, thereby providing the user terminal 102 a connection to the communication system. Typically, but not necessarily, the evolved node B comprises all radio-related functionalities of the communication whereby the evolved node B, for example, schedules transmissions by assigning certain uplink resources for the user terminal and informing the user terminal about transmission formats to be used. The nodes 104, 106 may be configured to perform one or more of evolved node B functionalities described below with an embodiment, and to perform functionalities from different embodiments.

The evolved node B also provides the cells but the exemplary embodiments may be implemented with a solution having a separate controlling apparatus, and separate cell providing apparatuses controlled by a controlling apparatus. Further, the cells may be macro cells, and/or small cells.

The eNBs are configured to communicate with mobility management entity/serving gateway 100 using S1-MME/S1-U interface, for example. In addition, eNBs may communicate with each other using X2 interface.

To increase the bandwidth, and thereby the bitrate available to user terminal, carrier aggregation may be used. In carrier aggregation, communication link or carrier of more than one cell is allocated to the user terminal. Each aggregated carrier may be referred to as a component carrier, CC. The component carriers may be of different bandwidths.

In carrier aggregation, one cell is denoted as Primary Cell, PCell, and other cells the user terminals is connected to are denoted as Secondary Cells, SCell. In one form of carrier aggregation, PCell provides both uplink, UL, and downlink, DL, connections to the user terminal, while each SCell provides only a downlink connection. In the example of FIG. 1, user terminal utilises carrier aggregation and has a connection 108 in cell 104C with eNB 104 and a connection 110 in cell 106A with eNB 106. In this example we may assume that cell 104C is PCell and cell 106A is SCell.

As mentioned, PCell and SCell are connected via a non-ideal backhaul over X2 where maximum one-way latency might be 20 ms. The X2 interface is utilised in communication between the cells, such as exchanging signalling and data related to carrier aggregation. In general, the X2 interface supports exchange of information between eNBs to perform, for example, following functions: Handover (mobility of terminals between eNBs), load management (sharing of information to help spread loads more evenly), Co-ordinated Multi-Point transmission or reception (Neighbouring eNBs co-ordinate over X2 to reduce interference levels), network optimisation, eNB configuration update, cell activation, including neighbour list updates, mobility optimisation (co-ordination of handover parameters), and general management (initialising and resetting the X2).

The eNBs control the communication with the user terminals. Used resources and acknowledgement procedures are determined by the eNBs and related information signalled to user terminals. In LTE, the user terminal may receive a subframe from eNB. The subframe may contain a physical downlink control channel (PDCCH) formed in accordance with Downlink Control information (DCI) format. The DCI format may comprise a Downlink Assignment Index (DAI) for Time Division Duplexed (TDD) and Frequency Division Duplexed (FDD) operation. The user terminal may determine, dependent on the DAI, the number and ordering of Hybrid Automatic Repeat Request-Acknowledgment (HARQ-ACK) bits to be transmitted on a Physical Uplink Share Channel (PUSCH) and subsequently transmit the HARQ-ACK bits. The user terminal is configured to indicate successful/unsuccessful reception of data using the HARQ-ACK bits. The number of HARQ-ACK bits is not constant but it is set by the eNB depending on the resources allocated to the user terminal.

In an embodiment, for TDD UL/DL configuration 1-6 and a user terminal configured with more than one serving cell, the number of HARQ-ACK feedback bits is determined by values of two parameters, first parameter being $W_{DAI}^{UL}$ and second parameter being $V_{DAI,c}^{DL}$ which are transmitted in DAI and is decoded by the user terminal from Physical Downlink Control Channel PDCCH of PCell and SCell.

Figure 2:
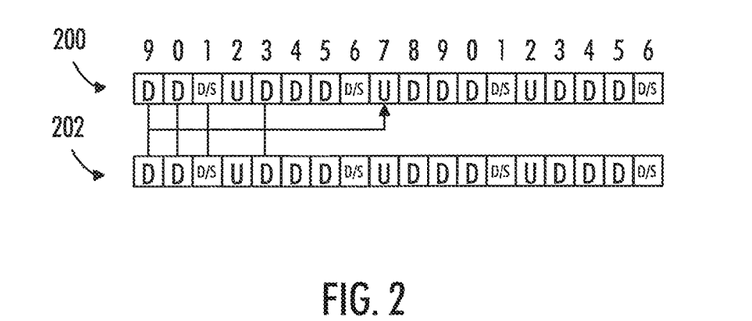
FIG. 2 illustrates an example of HARQ-ACK transmission.

FIG. 2 illustrates an example of HARQ-ACK transmission in connection with carrier aggregation with PCell and SCell. UE reports ACK/NACK of number of bits according to $W_{DAI}^{UL}$ and $V_{DAI,c}^{DL}$. The figure denotes HARQ feedback timing of TDD DL/UL configuration 2, which is the same DL/UL configuration for both PCell and SCell. However, embodiments of the invention are not limited to the same DL/UL configuration in PCell and SCell. The figure illustrates successive subframes (numbered from 0 to 9) of both PCell 200 and SCell 203.

In the example of FIG. 2, the ACK/NACK information of subframes 9, 0, 1, 3 (which may be denoted "downlink association set" as specified in 3GPP) of both PCell and SCell are transmitted in uplink subframe No. 7. For example, if there is transmission in all subframes of the downlink association set for both PCell and SCell. User terminal shall report 8 bits and every bit denotes the ACK/NACK of one subframe if we assume that user terminal configured transmission mode only supports single stream. If there are some subframes which are not transmitted by eNB cells, the number of ACK/NACK bits is less than 8.

When carrier aggregation is utilised in the above mentioned manner, where uplink is available only in the PCell and the PCell employs Time Division Duplex, TDD, there is a problem the reception of the HARQ-ACK bits. The PCell receives user terminal transmission, but it has no knowledge on the resources used by the SCell on the downlink. The SCell cannot send the information to the PCell using X2 interface because of the large latency of the X2 interface. Therefore, the PCell is unaware of the amount and scheduling of HARQ-ACK bits used by the user terminal regarding SCell transmissions.

In an embodiment, under the situation which PCell does not know the SCell has transmission or not, PCell and SCell select $W_{DAI}^{UL}$ and $V_{DAI,c}^{DL}$ such that user terminal assumes that all subframes in downlink association set have transmission for both PCell and SCell, even though this is not necessarily the case. In this manner, the user terminal will utilise maximum number of HARQ-ACK bits. The PCell will thus know the number of HARQ-ACK bits the user terminal transmits and is able to decode the transmission in a correct manner.

Figure 3A:
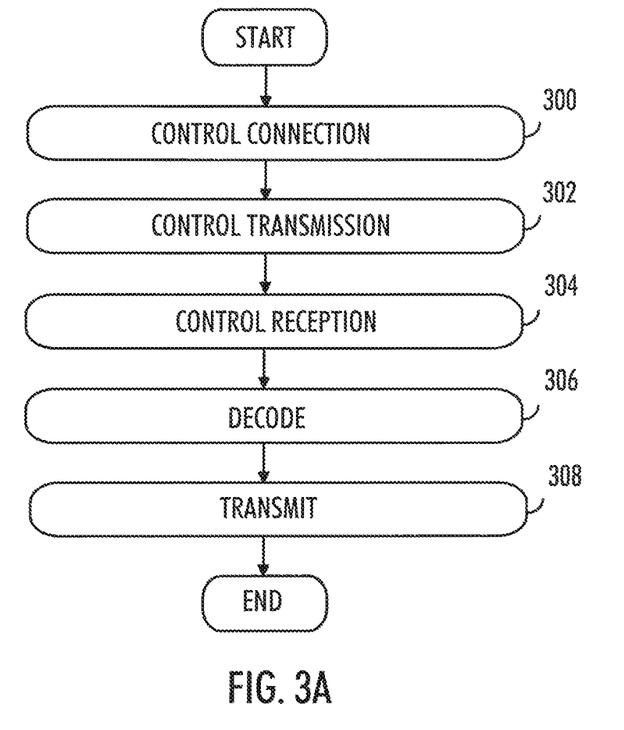
FIGS. 3A, 3B, 4 and 5 are flowcharts illustrating embodiments of the invention.

FIG. 3A is a flowchart illustrating an embodiment of the invention. The Figure illustrates an example of the operation of an apparatus or a network element such as an eNB controlling a Primary Cell utilising carrier aggregation or a part of an eNB. The steps of the flowchart may also be in different order than illustrated in FIG. 3A.

In step 300, the apparatus is configured to control a connection to user terminal 102 having connections 108, 110 to more than one cell 104C, 106A for carrier aggregation.

In step 302, the apparatus is configured to control transmission of signalling to user terminal 102 to use maximum allowable number of bits of hybrid automatic request feedback in transmission of positive and negative acknowledgements to more than one aggregated cell.

In step 304, the apparatus is configured to control reception of feedback data from the user terminal 102, the feedback bits comprising positive and negative acknowledgements related to user terminal connections with the more than one aggregated cell 104C, 106A.

In step 306, the apparatus is configured to decode and process feedback bits related to the connections 108 controlled by the apparatus.

In step 308, the apparatus is configured to transmit feedback bits related to other connections 110 to respective cell 106A. Thus, in an embodiment, the PCell may transmit feedback bits of a connection managed by a SCell to the respective SCell.

In an embodiment, the feedback bits sent by the PCell to SCells are accompanied by the System Frame Number, SFN, and subframe number of Transmission Time Interval, TTI, in which the feedback bits were received.

Figure 3B:
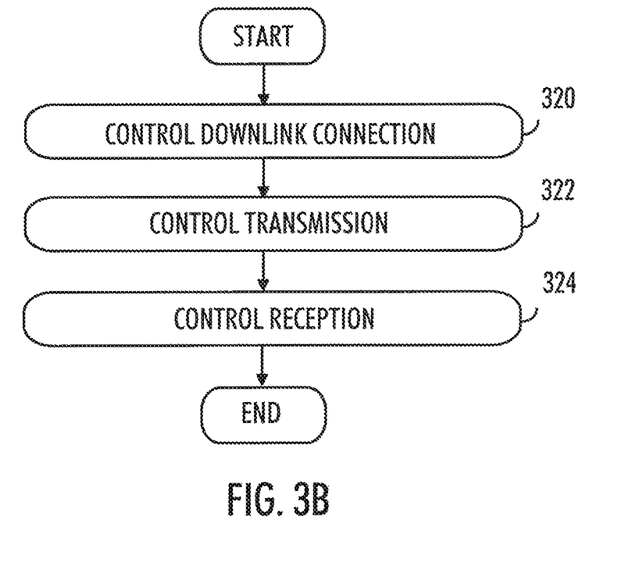

FIG. 3B is a flowchart illustrating an embodiment of the invention. The Figure illustrates an example of the operation of an apparatus or a network element such as an eNB controlling a Secondary Cell utilising carrier aggregation or a part of an eNB. The steps of the flowchart may also be in different order than illustrated in FIG. 3B.

In step 320, the apparatus is configured to control a downlink connection to user terminal 102 having connections 108, 110 to more than one cell 104C, 106A for carrier aggregation.

In step 322, the apparatus is configured to control transmission of signalling to the user terminal to use maximum allowable number of bits of hybrid automatic request feedback in transmission of positive and negative acknowledgements to more than one aggregated cell.

In step 324, the apparatus is configured to control reception of a transmission from a base station serving an aggregated cell, the transmission comprising feedback bits, the feedback bits comprising positive and negative acknowledgements related to user terminal connection with the apparatus. Thus, in an embodiment, SCell may receive feedback bits from PCell, where the feedback bits are related to the connection controlled by the SCell and where the feedback bits were received from the user terminal by the PCell.

There thus may be feedback bit related communication between PCell and SCell where PCell acts as a transmitter and SCell acts as a receiver.

In an embodiment, the feedback bits received by the apparatus are accompanied by the System Frame Number, SFN, and subframe number of Transmission Time Interval, TTI, in which the feedback bits were received. Based on the received information, the apparatus can correlate the feedback bits with the actual PDSCH transmissions.

In an embodiment, the eNB may be configured to send a pseudo DAI (Downlink Assignment Index) to the user terminal conveyed in PDCCH, so that the user terminal shall report ACK/NACK with maximum number of HARQ-ACK feedback bits. Thus the eNB will know the expected number of HARQ-ACK feedback bits punctured and is able to decode PUSCH correctly.

In an embodiment, the eNB shall allow maximum number of subframes of dynamically scheduled PDSCH transmissions so far in the downlink association set to take the place of accumulative number of subframes with PDSCH transmission and with PDCCH or Evolved PDCCH indicating downlink Semi-Persistent Scheduling, DL SPS, release in DCI formats 1/1A/1B/1D/2/2A/2B/2C/2D.

In an embodiment, the eNB shall allow maximum total number of subframes of PDSCH transmissions (including both Semi-Persistent Scheduling and dynamic scheduling transmissions) in the downlink association set to take the place of accumulative number of subframes with PDSCH transmission and with PDCCH or Evolved PDCCH indicating DL SPS release in DCI format 0/4.

The PCell, when receiving HARQ-ACK feedback bits, is able to decode and process the bits related to its own transmissions. The SCell(s) HARQ-ACK feedback bits (HARQ ACK/NACK/DTX) from PUSCH decoded by the PCell are sent transparently to the respective SCell(s), regardless that PCell has no way of knowing if the PDSCH has actually been scheduled in the Scell.

Let us study an example how values for the first and second parameter $W_{DAI}^{UL}$ and $V_{DAI,c}^{DL}$ controlling the HARQ-ACK feedback bits sent by the user terminal are selected in the eNBs.

In an embodiment, a value M is given for the first parameter $W_{DAI}^{UL}$ controlling transmission of feedback data, where M equals the size of downlink association set, or the number of downlink subframes that are reported within the same uplink frame. In addition, the first parameter $W_{DAI}^{UL}$, may follow the rule of following table:

TABLE 1

| DAI MSB, LSB | $W_{DAI}^{UL}$ |
|---|---|
| 0, 0 | 1 |
| 0, 1 | 2 |
| 1, 0 | 3 |
| 1, 1 | 4 |

In an embodiment, for the primary cell a value i+1 is given for the second parameter $V_{DAI,c}^{DL}$ controlling reception of feedback data, where (0≤i<M) and where M equals the size of downlink association set. Here i has value as in $k_i$: subframe in downlink association set: K: $\{k_0, k_1, \ldots, k_{M-1}\}$. In addition, the second parameter $V_{DAI,c}^{DL}$ may follow the rule of following table:

TABLE 2

| DAI MSB, LSB | $V_{DAI,c}^{DL}$ | Number of subframes with PDSCH transmission and with (E)PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

In an embodiment, for SCell(s) a value $\Sigma_{i=0}^{M-1} T_{i,c}$ is given for the second parameter $V_{DAI,c}^{DL}$ controlling transmission of feedback data, where M equals the size of downlink association set, T equals value 1, if there is a Physical Downlink Shared Control Channel transmission or value 0 if there is no transmission, and c is index of the cell.

Figure 4:
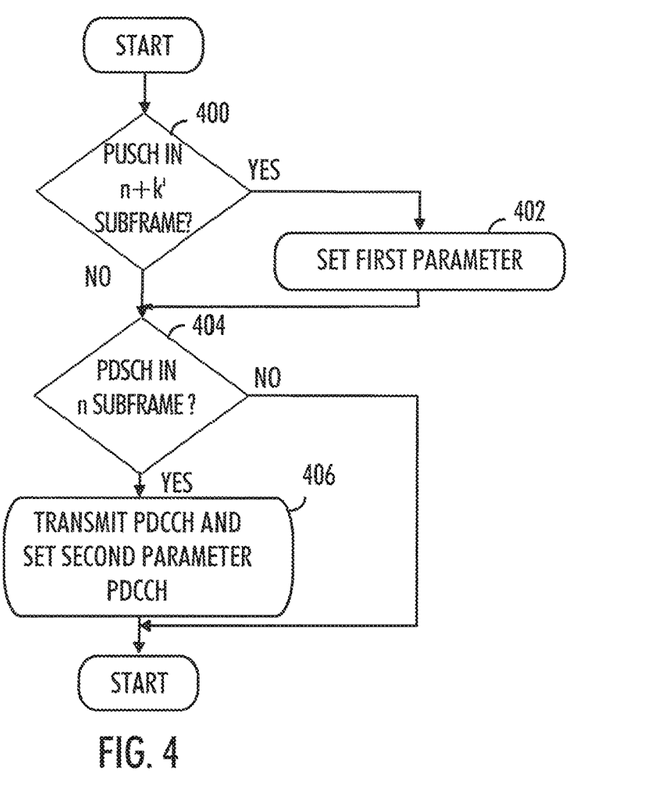

FIG. 4 is a flowchart illustrating an embodiment of the invention. The Figure illustrates an example of the operation of an apparatus or a network element such as an eNB controlling a Primary Cell utilising carrier aggregation or a part of an eNB.

In step 400, the apparatus is configured to determine if there is PUSCH in subframe n+k'. Here n is the TTI in which the eNB transmit PDSCH, n+k' means the TTI in which UE reports HARQ ACK/NACK. If there is the first parameter $W_{DAI}^{UL}$ is given the value M in step 402.

If not, the apparatus is configured to determine in step 404 if there is PDSCH in subframe n. Here n is the TTI in which the eNB transmit PDSCH.

If there is the second parameter $V_{DAI,c}^{DL}$ is given the value i+1 in step 406, where (0≤i<M) and where M equals the size of downlink association set.

Figure 5:
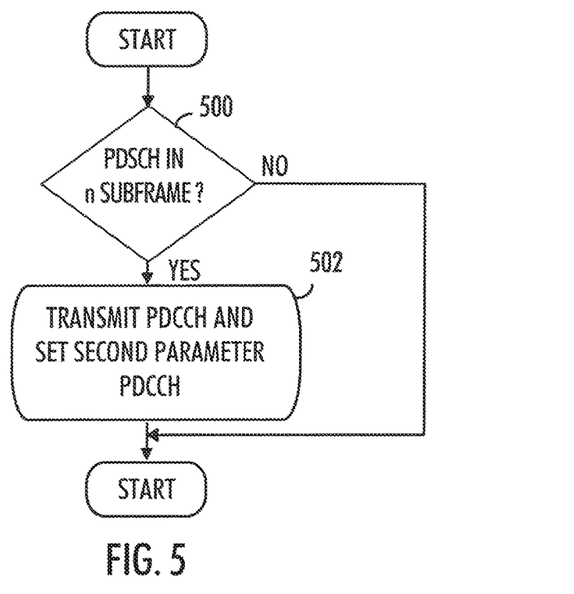

FIG. 5 is a flowchart illustrating an embodiment of the invention. The Figure illustrates an example of the operation of an apparatus or a network element such as an eNB controlling a Secondary Cell utilising carrier aggregation or a part of an eNB.

In step 500, the apparatus is configured to determine if there is PDSCH in n subframe. Here n is the TTI in which the eNB transmit PDSCH.

If there is the second parameter $V_{DAI,c}^{DL}$ is given in step 502 the value a value $\Sigma_{i=0}^{M-1} T_{i,c}$ where M equals the size of downlink association set, T equals value 1, if there is a Physical Downlink Shared Control Channel transmission or value 0 if there is no transmission, and c is index of the cell.

Figure 6:
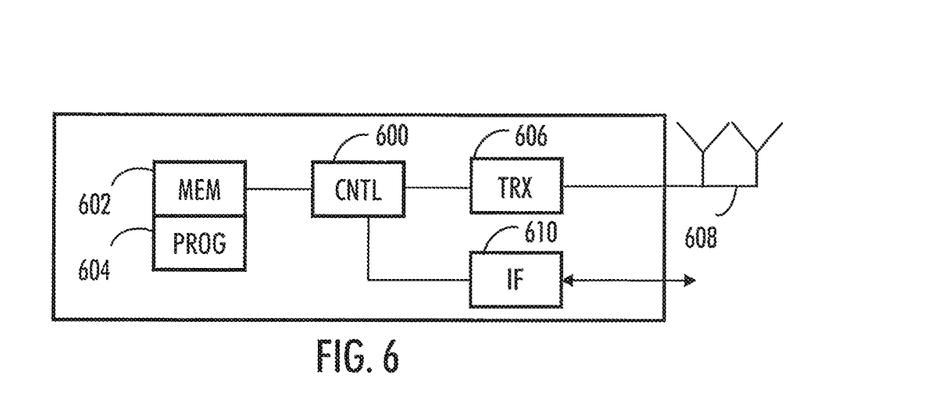
FIGS. 6 and 7 illustrate simplified examples of apparatuses applying embodiments of the invention.

FIG. 6 illustrates an embodiment. The figure illustrates a simplified example of an apparatus applying embodiments of the invention. In some embodiments, the apparatus may be an eNB or a part of an eNB.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 600 configured to control at least part of the operation of the apparatus.

The apparatus may comprise a memory 602 for storing data. Furthermore the memory may store software 604 executable by the control circuitry 400. The memory may be integrated in the control circuitry.

The apparatus comprises a transceiver 606. The transceiver is operationally connected to the control circuitry 600. It may be connected to an antenna arrangement 608.

The apparatus may further comprise interface circuitry 610 configured to connect the apparatus to other devices and network elements of communication system, for example to other corresponding. The interface may implement X2 interface and/or S1-MME/S1-U interface, for example. The interface may provide a wired or wireless connection to the communication network.

In an embodiment, the software 604 may comprise a computer program comprising program code means adapted to cause the control circuitry 600 of the apparatus, if the apparatus is configured to serve a Primary Cell, to control a connection to user terminal having connections to more than one cell for carrier aggregation; control transmission of signalling to user terminal to use maximum allowable number of bits of hybrid automatic request feedback in transmission of positive and negative acknowledgements to more than one aggregated cell; control reception of feedback bits from the user terminal, the feedback bits comprising positive and negative acknowledgements related to user terminal connections with the more than one aggregated cell; decode and process feedback bits related to the connections controlled by the apparatus; and transmit feedback bits related to other connections to respective cell.

In an embodiment, the software 604 may comprise a computer program comprising program code means adapted to cause the control circuitry 600 of the apparatus, if the apparatus is configured to serve a Secondary Cell, to control a downlink connection to a user terminal having connections to more than one cell for carrier aggregation; control transmission of signalling to the user terminal to use maximum allowable number of bits of hybrid automatic request feedback in transmission of positive and negative acknowledgements to more than one aggregated cell; control reception of a transmission from a base station serving an aggregated cell, the transmission comprising feedback bits, the feedback bits comprising positive and negative acknowledgements related to user terminal connection with the apparatus.

Figure 7:
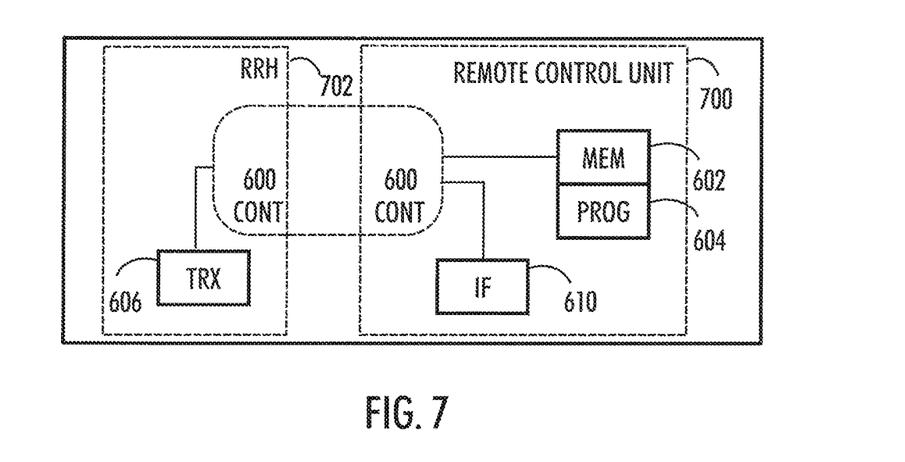

In an embodiment, as shown in FIG. 7, at least some of the functionalities of the apparatus of FIG. 6 may be shared between two physically separate devices, forming one operational entity. Therefore, the apparatus may be seen to depict the operational entity comprising one or more physically separate devices for executing at least some of the described processes. Thus, the apparatus of FIG. 7, utilizing such shared architecture, may comprise a remote control unit RCU 700, such as a host computer or a server computer, operatively coupled (e.g. via a wireless or wired network) to a remote radio head RRH 702 located in the base station. In an embodiment, at least some of the described processes may be performed by the RCU 700. In an embodiment, the execution of at least some of the described processes may be shared among the RRH 702 and the RCU 700.

In an embodiment, the RCU 700 may generate a virtual network through which the RCU 700 communicates with the RRH 702. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

An embodiment provides an apparatus comprising means for controlling a connection to a user terminal having connections to more than one cell for carrier aggregation, means for controlling transmission of signalling to the user terminal to use maximum allowable number of bits of hybrid automatic request feedback in transmission of positive and negative acknowledgements to more than one aggregated cell, means for controlling reception of feedback bits from the user terminal, the feedback bits comprising positive and negative acknowledgements related to user terminal connections with the more than one aggregated cell, means for decoding and processing feedback bits related to the connections controlled by the apparatus and means for transmitting feedback bits related to other connections to respective cell.

An embodiment provides an apparatus comprising means for controlling a downlink connection to a user terminal having connections to more than one cell for carrier aggregation, means for controlling transmission of signalling to the user terminal to use maximum allowable number of bits of hybrid automatic request feedback in transmission of positive and negative acknowledgements to more than one aggregated cell, and means for controlling reception of a transmission from a base station serving an aggregated cell, the transmission comprising feedback bits, the feedback bits comprising positive and negative acknowledgements related to user terminal connection with the apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, comprising:
   at least one processor; and
   at least one memory including computer program code,
   the at least one memory and the computer program code configured to, with the at least one processor, cause the apparatus at least to perform:
   control a connection to a user terminal having connections to more than one cell for carrier aggregation;
   control transmission of signalling to the user terminal to use a maximum allowable number of bits of hybrid automatic request feedback in transmission of positive and negative acknowledgements to more than one aggregated cell;
   control reception of feedback bits from the user terminal, the feedback bits comprising positive and negative acknowledgements related to user terminal connections with the more than one aggregated cell;
   decode and process feedback bits related to the connections controlled by the apparatus; and
   transmit feedback bits related to other connections to respective cell, the transmitted feedback bits including a System Frame Number.

2. The apparatus of claim 1, the at least one memory and the computer program code are configured to, with the at least one processor, cause the apparatus, when transmitting feedback bits related to other connections to respective cell, further to perform:
   further include in the transmission of the feedback bits to other connections to respective cell the System Frame Number and a subframe number of a Transmission Time Interval in which the feedback bits were received.

3. The apparatus of claim 1, the at least one memory and the computer program code configured to, with the at least one processor, cause the apparatus further to perform:
   determine a value M for a first parameter $W_{DAI}^{UL}$ controlling transmission of feedback bits, where M equals a size of a downlink association set.

4. The apparatus of claim 1, the at least one memory and the computer program code configured to, with the at least one processor, cause the apparatus further to perform:
   determine for the apparatus a value i+1 for a second parameter $V_{DAI,c}^{DL}$ controlling transmission of feedback bits, where i is larger than zero and smaller than M, where M equals a size of a downlink association set.

5. An apparatus in a communication system, comprising:
   at least one processor; and
   at least one memory including computer program code,
   the at least one memory and the computer program code configured to, with the at least one processor, cause the apparatus at least to perform:
   control a downlink connection to a user terminal having connections to more than one cell for carrier aggregation;
   control transmission of signalling to the user terminal to use maximum allowable number of bits of hybrid automatic request feedback in transmission of positive and negative acknowledgements to more than one aggregated cell;
   control reception of a transmission from a base station serving an aggregated cell, the transmission comprising feedback bits, the feedback bits comprising positive and negative acknowledgements and a System Frame Number related to user terminal connection with the apparatus; and
   detect in the transmission from the base station serving an aggregated cell a subframe number of Transmission Time Interval in which the feedback bits were received by the base station serving an aggregated cell.

6. The apparatus of claim 5, the at least one memory and the computer program code configured to, with the at least one processor, cause the apparatus further to perform:
   determine a value $\Sigma_{i=0}^{M-1} T_{i,c}$ for a parameter $V_{DAI,c}^{DL}$ controlling transmission of feedback bits, where, where M equals a size of a downlink association set, T equals value 1, if there is a Physical Downlink Shared Control Channel transmission or value 0 if there is no transmission, and c is index of a cell.

7. The apparatus of claim 5, the at least one memory and the computer program code configured to, with the at least one processor, cause the apparatus further to perform:

correlate, on the basis of the System Frame Number and subframe number of Transmission Time Interval, the feedback bits with the signalling transmitted to the user terminal.

8. A method in a communication system, comprising:
controlling a connection to a user terminal having connections to more than one cell for carrier aggregation;
controlling transmission of signalling to the user terminal to use maximum allowable number of bits of hybrid automatic request feedback in transmission of positive and negative acknowledgements to more than one aggregated cell;
controlling reception of feedback bits from the user terminal, the feedback bits comprising positive and negative acknowledgements related to user terminal connections with the more than one aggregated cell;
decoding and processing feedback bits related to the connections controlled by an apparatus; and
transmitting feedback bits related to other connections to respective cell, the transmitted feedback bits including a System Frame Number.

9. The method of claim 8, further comprising:
further including in the transmission to other connections to respective cell a subframe number of Transmission Time Interval in which the feedback bits were received.

10. The method of claim 8, further comprising:
determining a value M for a first parameter $W_{DAI}^{UL}$ controlling reception of feedback data, where M equals a size of a downlink association set.

11. The method of claim 8, further comprising:
determining for the apparatus a value i+1 for a second parameter $V_{DAI,c}^{DL}$ controlling reception of feedback data, where i is larger than zero and smaller than M, where M equals a size of a downlink association set.

12. A method in a communication system, comprising:
controlling a downlink connection to a user terminal having connections to more than one cell for carrier aggregation;
controlling transmission of signalling to the user terminal to use maximum allowable number of bits of hybrid automatic request feedback in transmission of positive and negative acknowledgements to more than one aggregated cell; and
controlling reception of a transmission from a base station serving an aggregated cell, the transmission comprising feedback bits, the feedback bits comprising positive and negative acknowledgements and a System Frame Number related to user terminal connection with an apparatus; and
detecting in the transmission from the base station serving an aggregated cell a subframe number of Transmission Time Interval in which the feedback bits were received by the base station serving an aggregated cell.

13. The method of claim 12, further comprising:
determining a value $\Sigma_{i=0}^{M-1} T_{i,c}$ for a parameter $V_{DAI,c}^{DL}$ controlling reception of feedback data, where, where M equals a size of a downlink association set, T equals value 1, if there is a Physical Downlink Shared Control Channel transmission or value 0 if there is no transmission, and c is index of a cell.

14. The method of claim 12, further comprising:
correlating, on the basis of the System Frame Number and subframe number of Transmission Time Interval, the feedback bits with the signalling transmitted to the user terminal.

15. A non-transitory computer readable medium including a computer program, comprising program instructions which, when executed by a processor of an electronic apparatus, are configured to control the apparatus to execute the steps of claim 8.

* * * * *